United States Patent
Lee

(10) Patent No.: US 11,514,481 B2
(45) Date of Patent: Nov. 29, 2022

(54) SALES SUPPORT MARKETING SYSTEM

(71) Applicant: Sang Yup Lee, Seoul (KR)

(72) Inventor: Sang Yup Lee, Seoul (KR)

(*) Notice: Subject to any disclaimer, the term of this patent is extended or adjusted under 35 U.S.C. 154(b) by 0 days.

(21) Appl. No.: 17/059,171

(22) PCT Filed: Apr. 25, 2019

(86) PCT No.: PCT/KR2019/004991
§ 371 (c)(1),
(2) Date: Nov. 25, 2020

(87) PCT Pub. No.: WO2019/225869
PCT Pub. Date: Nov. 28, 2019

(65) Prior Publication Data
US 2021/0217063 A1    Jul. 15, 2021

(30) Foreign Application Priority Data

May 25, 2018 (KR) .................. 10-2018-0059950

(51) Int. Cl.
*G06Q 30/02* (2012.01)
*G06F 40/186* (2020.01)
*G06F 40/14* (2020.01)

(52) U.S. Cl.
CPC ......... *G06Q 30/0276* (2013.01); *G06F 40/14* (2020.01); *G06F 40/186* (2020.01)

(58) Field of Classification Search
None
See application file for complete search history.

(56) References Cited

U.S. PATENT DOCUMENTS

| | | | |
|---|---|---|---|
| 2006/0184642 A1* | 8/2006 | Red | G06F 16/958 709/217 |
| 2007/0271149 A1* | 11/2007 | Siegel | G06Q 30/0641 705/26.41 |
| 2012/0047021 A1* | 2/2012 | Borchetta | G06Q 30/02 705/14.66 |
| 2012/0284324 A1* | 11/2012 | Jarville | G06Q 30/0201 709/203 |
| 2014/0214473 A1* | 7/2014 | Gentile | G06Q 10/06313 705/7.23 |
| 2015/0356580 A1* | 12/2015 | Kobayashi | G06Q 30/0203 705/7.32 |
| 2017/0344656 A1* | 11/2017 | Koren | G06F 3/0484 |

(Continued)

FOREIGN PATENT DOCUMENTS

| JP | 2002-189678 A | 7/2002 |
|---|---|---|
| KR | 10-0943479 B1 | 2/2010 |

(Continued)

*Primary Examiner* — Ariel Mercado
(74) *Attorney, Agent, or Firm* — Maschoff Brennan

(57) ABSTRACT

A marketing system that supports sales of goods by interlocking a customer terminal and an administrator terminal including a central server which provides an event page production tool to the administrator terminal, receives information about an event page, and transmits to the customer terminal; an administrator terminal for receiving the event page production tool from the central server to input corresponding variables to produce an event page; and a customer terminal for receiving the event page produced by the administrator terminal from the central server and inputting necessary information.

3 Claims, 11 Drawing Sheets

(56) References Cited

U.S. PATENT DOCUMENTS

| | | | | |
|---|---|---|---|---|
| 2017/0371624 | A1* | 12/2017 | Cheung | G06F 40/106 |
| 2018/0315063 | A1* | 11/2018 | Cheesman | G06Q 30/0203 |
| 2018/0316571 | A1* | 11/2018 | Andrade | G06Q 10/06398 |
| 2019/0228106 | A1* | 7/2019 | Dickerson | G06F 16/972 |

FOREIGN PATENT DOCUMENTS

| | | |
|---|---|---|
| KR | 10-2013-0003700 A | 1/2013 |
| KR | 10-2014-0119485 A | 10/2014 |
| KR | 10-2015-0136173 | 12/2015 |
| KR | 10-2016-0109903 A | 9/2016 |

* cited by examiner

| Member Name | Phone number | Sex | Birthday | 1 click | 2 click | 3 click | Main click | Purchase click | Click to join | Access route | Connection location |
|---|---|---|---|---|---|---|---|---|---|---|---|
| Lee Sang-yeop | 010-9294-7893 | M | 1975.12.01 | 3 | 2 | 1 | 5 | 2 | 1 | Facebook | Seoul/Seocho-dong |
| Jeong bai-hun | 010-111-1111 | M | 1991.10.29 | 1 | 1 | 1 | 1 | 1 | 0 | Kakao Talk | Seoul/Cheongdam-dong |
| No response | No response | No response | No response | 1 | 5 | 2 | 8 | 3 | 0 | Unidentified | Overseas/Japan |
| Kim Mal-suk | 010-111-1112 | W | 2000.10.11 | 0 | 1 | 0 | 0 | 1 | 0 | Text | Seoul/Guro-dong |
| Hing Sook-ja | 010-1111-1113 | W | No response | 0 | 0 | 1 | 0 | 0 | 1 | Blog | Busan/Bushe on 2-dong |

*FIG. 5*

| Start date | End date | URL click | Button 1 click | Button 1 click rate | Button 2 click | Button 2 click rate | Button 3 click | Button 3 click rate |
|---|---|---|---|---|---|---|---|---|
| 2018.05.05 | 2018.05.12 | 300 | 60 | 22.0% | 530 | 176.7% | 263 | 87.7% |
| 2018.05.12 | 2018.05.12 | 50 | 10 | 20.0% | 53 | 106.0% | 27 | 54.0% |
| 2018.05.11 | 2018.05.11 | 40 | 8 | 20.0% | 90 | 225.0% | 45 | 112.5% |
| 2018.05.10 | 2018.05.10 | 30 | 8 | 26.7% | 46 | 153.3% | 23 | 76.7% |
| 2018.05.09 | 2018.05.09 | 40 | 8 | 20.0% | 48 | 120.0% | 24 | 60.0% |
| 2018.05.08 | 2018.05.08 | 30 | 8 | 26.7% | 50 | 166.7% | 25 | 83.3% |
| 2018.05.07 | 2018.05.07 | 40 | 8 | 20.0% | 65 | 162.5% | 30 | 75.0% |
| 2018.05.06 | 2018.05.06 | 30 | 4 | 13.3% | 90 | 300% | 45 | 150.0% |
| 2018.05.05 | 2018.05.05 | 40 | 12 | 30.0% | 88 | 220.0% | 45 | 110.0% |

*FIG. 6A*

| Event interest rate | | Purchase possibility rate | | Frequenter possibility rate | | Membership registration rate | | Event activation rate | | |
|---|---|---|---|---|---|---|---|---|---|---|
| Main button click | Main button click rate | Purchase button click | Purchase button click rate | Join button click | Join button click rate | Member information input | Member information input rate | Average of 1-3 button clicks | Event Activation score | Activation score |
| 82 | 27.3% | 29 | 9.7% | 65 | 21.7% | 55 | 18.3% | 286.3 | 95.4% | 95.4 |
| 8 | 16.0% | 5 | 10.0% | 10 | 20.0% | 9 | 18.0% | 30.0 | 60.0% | 60.0 |
| 7 | 17.5% | 4 | 10.0% | 9 | 22.5% | 8 | 20.0% | 47.7 | 119.2% | 119.2 |
| 9 | 30.0% | 3 | 10.0% | 6 | 20.0% | 6 | 20.0% | 25.7 | 85.6% | 85.6 |
| 15 | 37.5% | 2 | 5.0% | 5 | 12.5% | 4 | 10.0% | 26.7 | 66.7% | 66.7 |
| 13 | 43.3% | 2 | 6.7% | 6 | 20.0% | 5 | 16.7% | 27.7 | 92.2% | 92.2 |
| 9 | 22.5% | 3 | 7.5% | 8 | 20.0% | 7 | 17.5% | 34.3 | 85.8% | 85.8 |
| 8 | 26.7% | 4 | 13.3% | 7 | 23.3% | 4 | 13.3% | 46.3 | 154.4% | 154.4 |
| 13 | 32.5% | 6 | 15.0% | 14 | 35.0% | 12 | 30.0% | 48.0 | 120.0% | 120.0 |

FIG. 6B

| Start date | End date | URL click | Charac-ter | Charac-ter access rate | sns Kakao talk plus friend | Kakao talk plus friend access rate | sns Face book | Face book access rate | sns Blog | Blog flow rate | sns *** | *** Access rate | Unidenti-fied | Unknown access rate | sns dependence rate SNS total | SNS dependence rate | SNS utilization point |
|---|---|---|---|---|---|---|---|---|---|---|---|---|---|---|---|---|---|
| 2018.05.05 | 2018.05.12 | 300 | 49 | 16.3% | 46 | 15.3% | 52 | 17.3% | 48 | 16.0% | 54 | 18.0% | 51 | 17.0% | 200 | 66.7% | 66.7 |
| 2018.05.12 | 2018.05.12 | 50 | 8 | 16.0% | 8 | 16.0% | 9 | 18.0% | 8 | 16.0% | 9 | 18.0% | 8 | 16.0% | 34 | 68.0% | 68.0 |
| 2018.05.11 | 2018.05.11 | 40 | 7 | 17.5% | 7 | 17.5% | 7 | 17.5% | 6 | 15.0% | 7 | 17.5% | 6 | 15.0% | 27 | 67.5% | 67.5 |
| 2018.05.10 | 2018.05.10 | 30 | 5 | 16.7% | 4 | 13.3% | 4 | 13.3% | 5 | 16.7% | 6 | 20.0% | 6 | 20.0% | 19 | 63.3% | 63.3 |
| 2018.05.09 | 2018.05.09 | 40 | 6 | 15.0% | 6 | 15.0% | 7 | 17.5% | 7 | 17.5% | 7 | 17.5% | 7 | 17.5% | 27 | 67.5% | 67.5 |
| 2018.05.08 | 2018.05.08 | 30 | 4 | 20.0% | 6 | 20.0% | 4 | 13.3% | 6 | 20.0% | 5 | 16.7% | 5 | 16.7% | 21 | 70.0% | 70.0 |
| 2018.05.07 | 2018.05.07 | 40 | 7 | 17.5% | 7 | 17.5% | 6 | 15.0% | 6 | 15.0% | 7 | 17.5% | 7 | 17.5% | 26 | 65.0% | 65.0 |
| 2018.05.06 | 2018.05.06 | 30 | 3 | 10.0% | 3 | 10.0% | 6 | 20.0% | 4 | 13.3% | 5 | 16.7% | 5 | 16.7% | 18 | 60.0% | 60.0 |
| 2018.05.05 | 2018.05.05 | 40 | 5 | 12.5% | 5 | 12.5% | 9 | 22.5% | 6 | 15.0% | 8 | 20.0% | 7 | 17.5% | 28 | 70.0% | 70.0 |

*FIG. 6C*

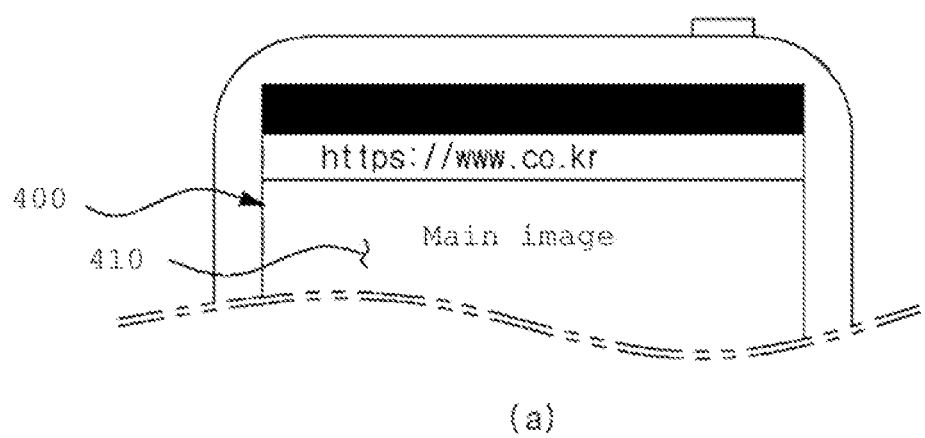
(a)
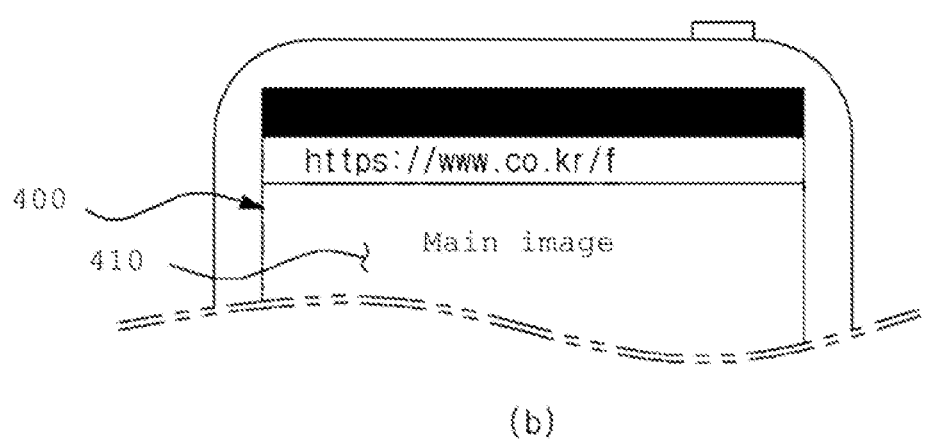
(b)
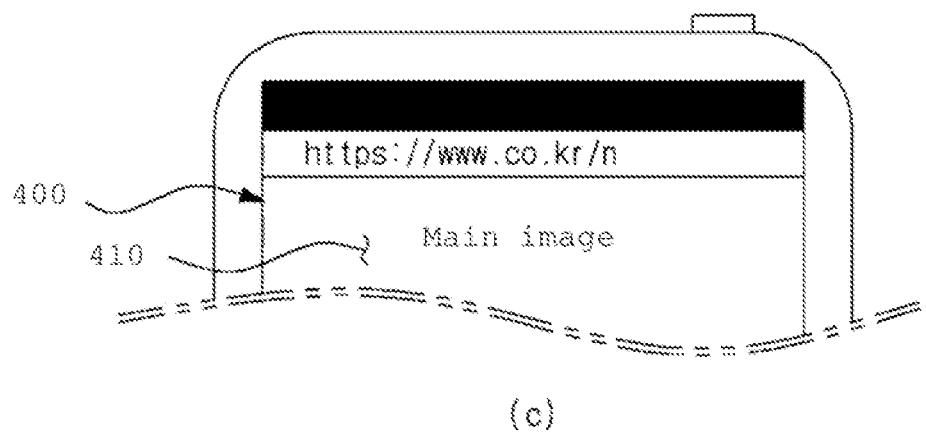
(c)
*FIG. 9*

SALES SUPPORT MARKETING SYSTEM

TECHNICAL FIELD

The present invention relates to a sales support marketing system, and more specifically, to a sales support marketing system that provides a platform through which an administrator easily produces an event page and performs a function of obtaining information about a customer terminal visiting an event page that has been produced by the administrator terminal. In addition, the sales support marketing system analyzes the purchase possibility rate of a customer, event interest rate, or activation rate of an event page posted on each SNS and automatically transmits graph and charted information to the administrator terminal, such that marketing management can be made easier and more efficient.

BACKGROUND ART

With the development of advertisement media and printing technology in the modern society, various advertisement prints are widely used according to various printing media or advertisement forms.

In recent years, a method of providing such advertisements been expanding from the aspect that previously depended only on print media to online media.

In addition, the method of requesting advertisement contents has evolved from a method in which the advertisement producer produces a completed form based on the basic concept set by a consumer and provides it as a printed matter to a method in which a web server provides a tool to set advertisements in a DIY method by selecting various templates and contents preset by the consumer himself, thereby producing advertisements with more diverse contents and designs.

According to Patent Registration No. 10-2015-0136173, a homepage production system and method are disclosed in which homepage production can be completed through one program.

However, according to the related art, in order to expose the completed homepage to more customers, the URL of the homepage is posted on each SNS.

In this case, for more efficient marketing management, there is a need to distinguish between SNS with low event interest rate and SNS with high event interest rate. In recent years, a separate survey is conducted to collect information in order to determine the route through which customers accessing the homepage the most, and the manager directly rearranges and analyzes the collected basic formation. The work process is executed separately.

However, the above method takes a lot of money and time to manage the homepage. In addition, general people who do not have knowledge of marketing management are having difficulty in a series of processes of collecting scattered customer information and classifying it to efficiently manage the homepage.

DISCLOSURE

Technical Problem

To solve the problems described above, an object of the present invention is to provide a sales support marketing system that provides a template for easily creating an event page to an administrator terminal, collects and automatically classifies activity information and customer information of a customer terminal accessing the produced event page, and automatically classifies and performs statistical analysis and chart production by schedule item.

The technical objects of the present disclosure are not limited to the above-mentioned one, and the other unmentioned technical objects and advantages will become apparent from the following description.

Technical Solution

To achieve the objects, according to the present invention, there is provided a marketing system that supports sales of goods by interlocking a customer terminal and an administrator terminal, which includes:

a central server (100) which provides an event page production tool to the administrator terminal, receives information about an event page, and transmits the received event page to the customer terminal;

an administrator terminal (200) that receives the event page production tool from the central server and inputs corresponding variables to produce an event page; and a customer terminal that receives the event page produced by the administrator terminal from the central server and inputs necessary information while performing a process provided by the event page.

In addition, the event page production page provided from the central server to the administrator terminal includes a main image upload menu for uploading the main image, a main address input menu for inputting and uploading a main image address linked to the main image, a button image upload menu for uploading an image of the movement button, and a button address input menu for inputting and uploading a movement button address linked to the movement button, where the administrator terminal uploads the main image and the main image address to the central server through inputs of the main image upload menu and the main address input menu, and uploads the image and the address of the movement button to the central server through inputs of the button image upload menu and the button address input menu.

The movement button (420) includes a first movement button (421) linked with a URL of a purchase page where a product is purchased through the customer terminal; a second movement button (422) linked to a survey response page through which personal information including name, contact information, sex, and birth date information of the customer terminal is input; and a third movement button (423) linked to a URL of a page provided with product sales information, wherein each page displayed on the terminal when each of the movement buttons is clicked is provided at one end thereof with a main button (430) for returning to a main of the event page (400).

In addition, the movement button (420) includes a first movement button (421) linked with a URL of a purchase page where a product is purchased through the customer terminal; a second movement button (422) linked to a survey response page through which personal information including name, contact information, sex, and birth date information of the customer terminal is input; and a third movement button (423) linked to a URL of a page provided with product sales information, wherein each page displayed on the terminal when each of the movement buttons is clicked is provided at one end thereof with a main button (430) for returning to a main of the event page (400).

In addition, the central server (100) includes a transmission/reception unit (110) for transmitting and receiving data to and from the customer terminal and the administrator terminal; a production tool (120) for providing a production page for producing an event page to the administrator terminal (200) to provide item input window information for inputting information to the production page; a page information DB (130) for storing configuration information of an event page input by the administrator terminal through the production page; a customer information acquisition unit (140) that accesses the event page to collect information input by the customer terminal; a customer information DB (150) for storing information about the customer terminal collected by the customer information acquisition unit (140); a data analysis module for classifying a number of customer terminal information stored in the customer information DB (150) by items including age, sex, number of clicks of each button existing in an event, and access route, and charting or statistically analyzing the customer terminal information to generate a result page (500); and a data output module (170) for performing a function of converting data analyzed through the data analysis module into an Excel file.

In addition, the main image address includes access route information. The customer information acquisition unit (140) acquires an URL accessed by a customer when the customer terminal accesses the event page at an arbitrary location, identifies an access route of the customer terminal by checking the access route information from the URL, automatically collects an access area to which the customer terminal (210) accesses through a GPS system of the customer terminal (210) or collecting location information of the customer terminal through a base station, and further acquires survey personal information data input through the customer terminal (210). In addition, the central server provides a result page (500) to display a result obtained by charting or statistically analyzing information input from a plurality of customer terminals accessing the event page of which production is completed, and delivered to the administrator terminal (200). In addition, the production page (300) includes a login window (310) for inputting an ID and a password; and a member information input button (320) for providing a page for newly registering member information including an ID and a password to be registered in the administrator terminal (200).

In addition, the result page (500) includes a customer detail information sheet (510) that synthesizes personal information stored in a customer information DB and analyzes each item; a sex analysis chart (520) that analyzes and displays the sex of a customer who accesses the event page; a weekly response chart (530) prepared as a graph by analyzing a number of visitors by each day of a week; and an age-specific chart (540) prepared as a graph by analyzing a number of visitors by ages, and wherein the result page (500) converts each statistical data into an Excel file by using the data output module (170).

In addition, the customer detail information sheet includes a number of event page visitors, a number of clicks of the main button, a number of clicks of the first movement button, a number of clicks of the second movement button, and a number of clicks of the third movement button, and wherein the marketing system provides detail information of a customer by analyzing the number of clicks and classifying the number of clicks into an event interest rate, purchase possibility rate, a frequenter possibility rate, a membership registration rate, an event activation rate, and an SNS dependent rate.

The event interest rate is defined as a value obtained by dividing the number of clicks of the main button by the total number of visitors to the event page, or a value obtained by summing the click rates of the first to third movement buttons. The purchase price efficiency is defined as a value obtained by dividing the number of clicks of the first movement button by the total number of event page visitors. The frequenter possibility rate is defined as a value obtained by dividing the number of clicks of the second movement button by the total number of event page visitors. The membership registration rate is defined as a value obtained by dividing the number of customers who have input all customer information in the survey by clicking the second movement button by the total number of event page visitors. The event activation rate is defined as a value obtained by dividing the total number of clicks of the first to third movement buttons by 3 to create an average score, and dividing this average score by the total number of event page visitors.

In addition, the SNS dependence rate is defined as a value obtained by dividing the sum of the number of clicks input in SNS by the total number of event page visitors, and the weight of marketing other than SNS and the weight of SNS marketing are compared with each other.

In addition, the production page (300) includes a schedule management unit (330) for inputting a start date and an end date of the event page (400).

Advantages and features of the present invention will be apparent with reference to the accompanying drawings and detailed description that follows.

It should be understood that the terms and words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Advantageous Effects

As described above, according to the present invention, there is provided a marketing system that provides a template for generating an event page to manager terminal, thereby reducing errors occurring in the process of creating a page and creating a home page in a short time. In addition, the marketing system collects information and activity information of the customer terminal accessing the event page on which the production is completed, and charts the automatically collected information data of the customer terminal or performs statistical analysis.

In particular, by automatically displaying statistical analysis result pages to general people who do not have knowledge about marketing management, anyone can easily manage event pages more efficiently.

DESCRIPTION OF DRAWINGS

FIG. 5 is a diagram showing a detailed customer information sheet in a marketing system according to the present invention.

FIG. 6 is a diagram showing a state in which statistical analysis is completed on a result page in a marketing system according to the present invention.

FIG. 9 is a diagram showing a main image address window that varies according to an access route in marketing system according to the present invention.

BEST MODE

Mode for Invention

Figure 1:
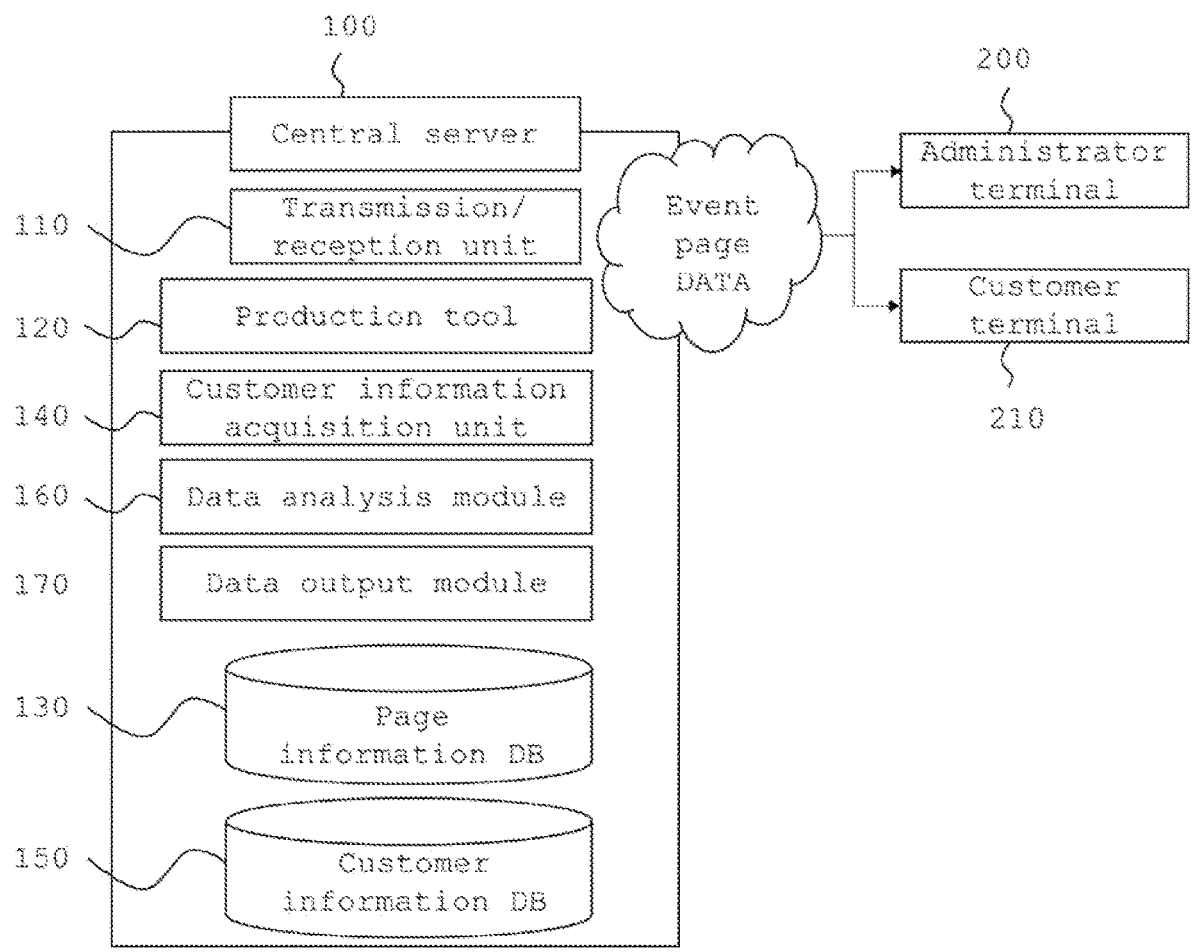
FIG. 1 is a detailed diagram showing the configuration of a marketing system according to the present invention.

Hereinafter, preferred embodiments according to the present invention will be described with reference to the accompanying drawings. In this process, the thicknesses of the lines and the sizes of the components shown in the drawings may be exaggerated for clarity and convenience of explanation.

In addition, the terms described below are defined in consideration of the functions of the present invention, which may vary depending on the intention or custom of the user, the operator. Therefore, the definitions of these terms should be based on the contents throughout this specification.

In addition, the following examples are not intended to limit the scope of the present invention, but are merely exemplary matters of the components presented in the claims of the present invention. Embodiments included in the technical idea throughout the specification of the present invention and including elements that can be substituted as equivalents in the elements of the claims may be included in the scope of the present invention.

FIG. 1 is a detailed diagram showing the configuration of a marketing system according to the present invention.

Referring to FIG. 1, the present invention is a marketing system, which supports sales of products to a customer terminal and an administrator terminal, includes a central server 100 for transmitting and receiving event page 400 data by interlocking the customer terminal with the administrator terminal; an administrator terminal 200 for receiving an ID from the server, creating an event page and receiving information on the customer terminal accessing a main screen of the created event page; and a customer terminal for receiving the event page 400 from the server.

In more detail, the central server 100 includes a transmission/reception unit 110 that transmits and receives data to and from the customer terminal and the administrator terminal; and a production tool 120 that provides a production page for producing an event page to the administrator terminal 200, and provides item input window information for inputting information to the production page.

In addition, the central server includes a page information DB 130 for storing configuration information of an event page input by the administrator terminal through the production page; a customer information acquisition unit 140 for accessing the event page to collect information input by the customer terminal; a customer information DB 150 for storing information about the customer terminal collected by the customer information acquisition unit 140; a data analysis module for classifying a number of customer terminal information stored in the customer information DB (150) by items including age, sex, the number of clicks of each button existing in an event, and access route, and charting or statistically analyzing the customer terminal information to generate a result page 500; and a data output module 170 for performing a function of converting data analyzed through the data analysis module into an Excel file.

In addition, the customer information acquisition unit 140 divides the access route of the customer terminal accessing the marketing event page 400 through various SNS and open markets through the URL of the marketing event page 400, and automatically collects an access area in which the customer terminal 210 accesses through a GPS system of the customer terminal 210 or collects location information of the customer terminal through a base station. The customer information acquisition unit 140 further acquires survey personal information data input through the customer terminal 210.

In addition, the ID of the administrator terminal registers account information by clicking the member registration button on the administrator terminal 200 and inputting and sending the TD and password to the server to the server. The account information may be logged in by using different IDs and passwords for each event page registered on each SNS page.

Figure 2:
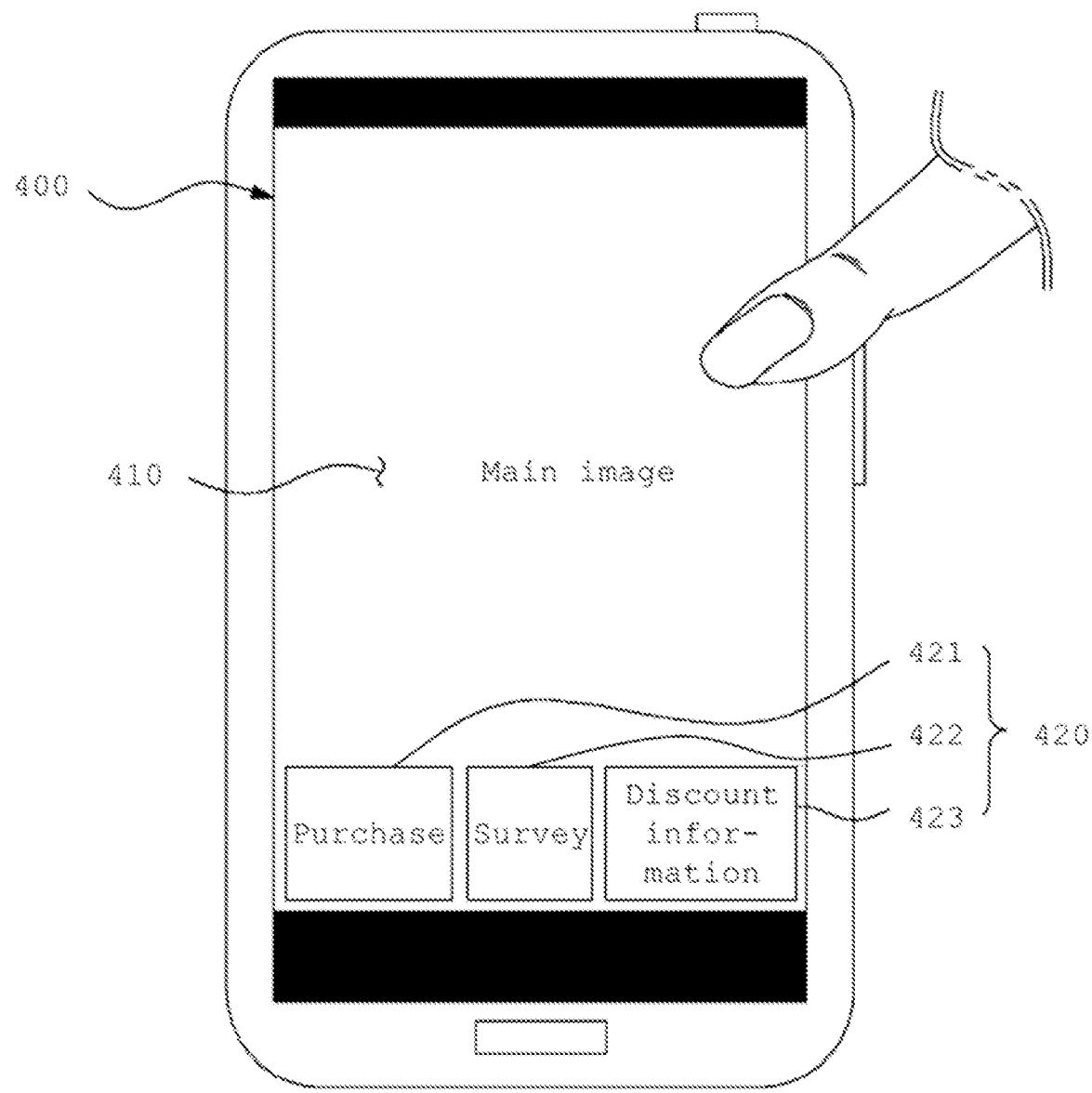
FIG. 2 is a diagram showing a state in which an event page is displayed on a customer terminal in the marketing system according to the present invention.

FIG. 2 is a diagram showing a state in which an event page is displayed on a customer terminal in the marketing system according to the present invention.

Referring to FIG. 2, the event page 400 includes a main image 410 displayed on the main screen; and one or more movement buttons 420 displayed on a portion of the main screen, where the main image and the movement button are linked to each url and when the main image or the movement button image is inputted, the event page moves to the corresponding url.

The movement button 420 includes a first movement button 421 linked to the URL of a purchase page through which a product is purchased through the customer terminal; a second movement button 422 linked to a survey response page through which personal information including name, contact information, sex, and birth date information of the customer terminal is input; and a third movement button 423 linked to the URL of a page provided with product sales information, where each page displayed on the terminal when each movement button is clicked is provided at one end with a main button 430 for returning to a main of the event page 400.

Figure 3:
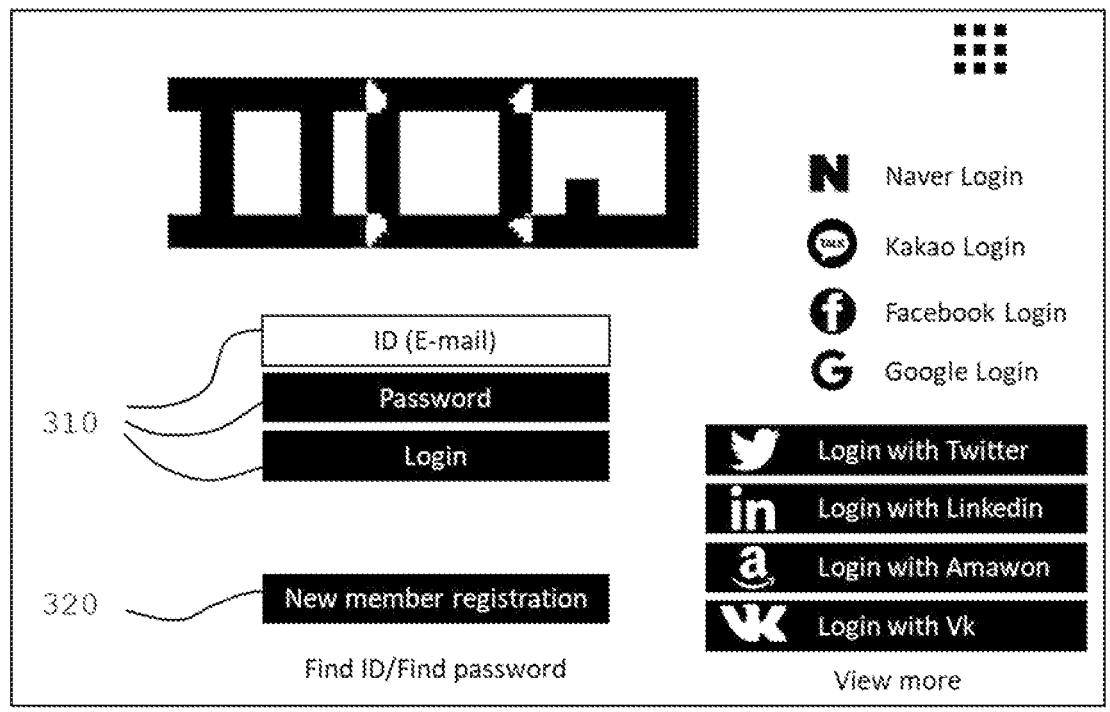
FIG. 3 is a diagram showing a login screen of a production page in a marketing system according to the present invention.

FIG. 3 is a diagram showing a login screen of a production page in a marketing system according to the present invention.

Referring to FIG. 3, the server provides a production page 300 including a production tool capable of producing an event page on the administrator terminal 200 in which the login authentication has been completed.

The production page 300 provided from the central server to the administrator terminal includes a main image upload menu for uploading the main image, a main address input menu for inputting and uploading a main image address linked to the main image, a button image upload menu for uploading an image of the movement button, and a button address input menu for inputting and uploading a movement button address linked to the movement button, where the administrator terminal uploads the main image and the main image address to the central server through inputs of the main image upload menu and the main address input menu, and uploads the image and the address of the movement button to the central server through inputs of the button image upload menu and the button address input menu.

In addition, the production page 300 includes a login window 310 for inputting an ID and a password; and a member information input button 320 for providing a page for newly registering member information including an ID and a password to be registered in the administrator terminal 200.

Figure 4A:
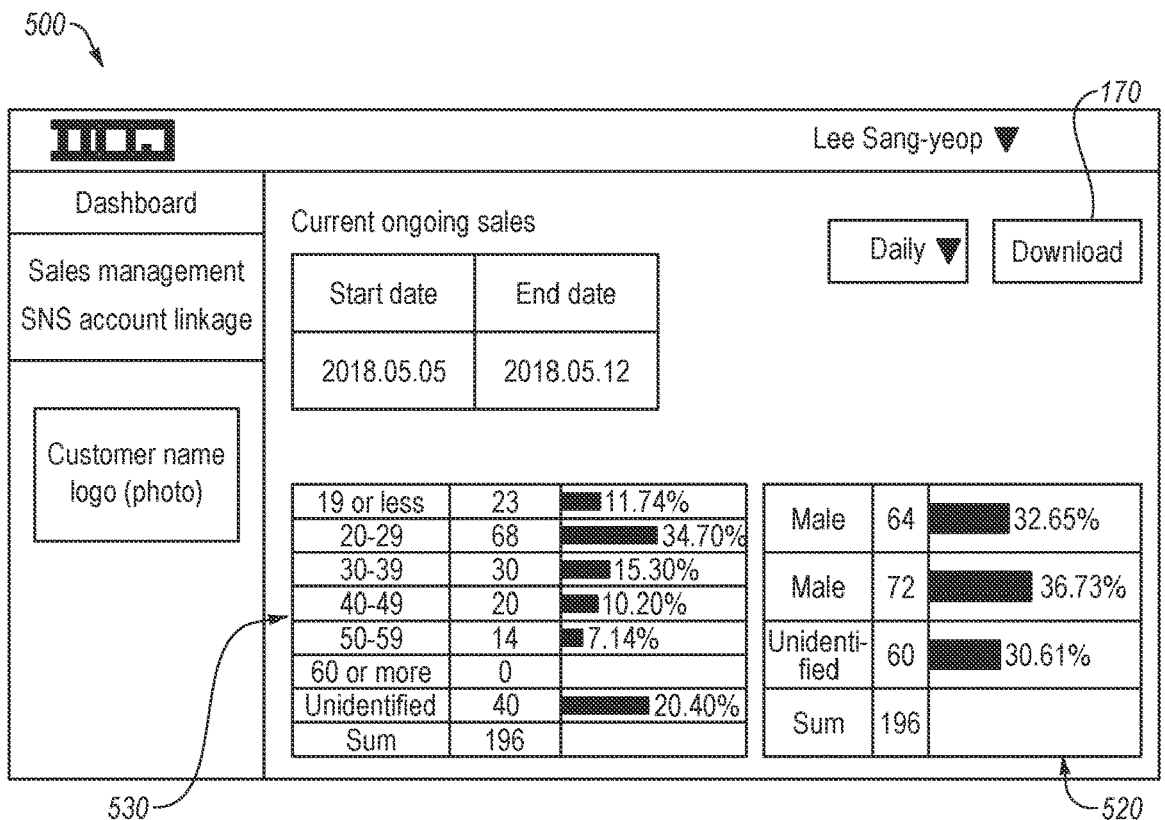
FIG. 4 is a diagram showing an example of a result page in a marketing system according to the present invention.
Figure 4B:
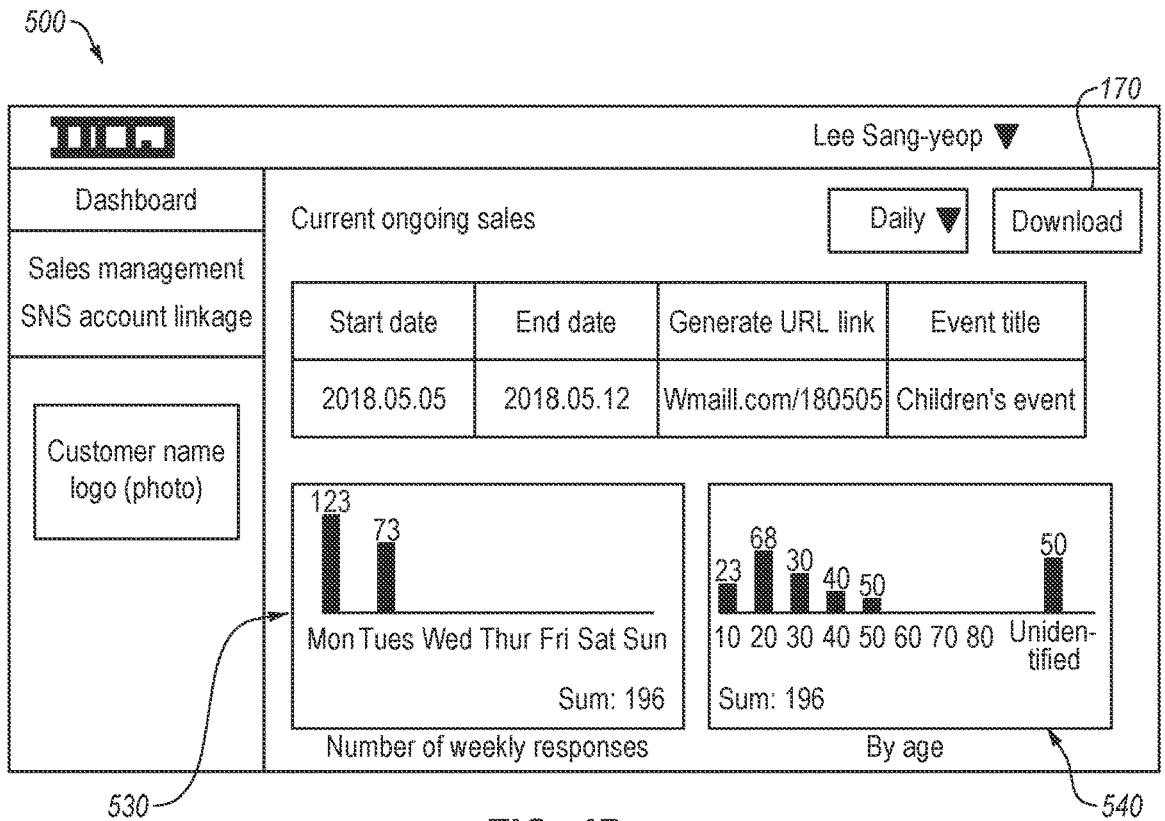

FIG. 4 is a diagram showing an example of a result page in a marketing system according to the present invention.

Referring to FIG. 4, the central server provides a result page 500 to display a result obtained by charting or statistically analyzing information input from a plurality of customer terminals accessing the event page of which production is completed, and delivered to the administrator terminal 200. In more detail, the result page 500 includes a customer detail information sheet 510 that synthesizes personal information stored in a customer information DB and analyzes each item; a sex analysis chart 520 that analyzes and displays the sex of a customer who accesses the event page; a weekly response chart 530 prepared as a graph by analyzing a number of visitors by each day of a week; and an age-specific chart 540 prepared as a graph by analyzing a number of visitors by ages, where the result page 500 converts each statistical data into an Excel file by using the data output module 170.

In the above description, the result page 500 supports a download function to convert each statistical data into an Excel File by using the data output module 170 and store it in the administrator terminal.

FIG. 5 is a diagram showing a detailed customer information sheet in a marketing system according to the present invention.

Referring to FIG. 5, the result page 500 includes a customer detail information sheet 510 that synthesizes personal information stored in the customer information DB and analyzes each item.

The customer detail information sheet is displayed on the administrator terminal, in which each item of information collected by a plurality of customer terminals connected to the event page is listed.

FIG. 6 is a diagram showing a state in which statistical analysis is completed on a result page in a marketing system according to the present invention.

Referring to FIG. 6, the customer detail information sheet 510 includes the number of event page visitors, the number of clicks of the main button, the number of clicks of the first movement button, the number of clicks of the second movement button, and the number of clicks of the third movement button. The marketing system provides detail information of a customer by analyzing the number of clicks and classifying the number of clicks into an event interest rate, a purchase possibility rate, a frequenter possibility rate, a membership registration rate, an event activation rate, and an SNS dependence rate.

The event interest rate is defined as a value obtained by dividing the number of clicks of the main button by the total number of visitors to the event page, or a value obtained by summing the click rates of the first to third movement buttons. The purchase price efficiency is defined as a value obtained by dividing the number of clicks of the first movement button by the total number of event page visitors. The frequenter possibility rate is defined as a value obtained by dividing the number of clicks of the second movement button by the total number of event page visitors. The membership registration race is defined as a value obtained by dividing the number of customers who have input all customer information in the survey by clicking the second movement button by the total number of event page visitors. The event activation rate is defined as a value obtained by dividing the total number of clicks of the first to third movement buttons by 3 to create an average score, and dividing this average score by the total number of event page visitors (see 'a' of FIG. 6). In addition, the SNS dependence rate is defined as a value obtained by dividing the sum of the number of clicks input in SNS by the total number of event page visitors, and the weight of marketing other than SNS and the weight of SNS marketing are compared with each other (see 'b' of FIG. 6).

Figure 7:
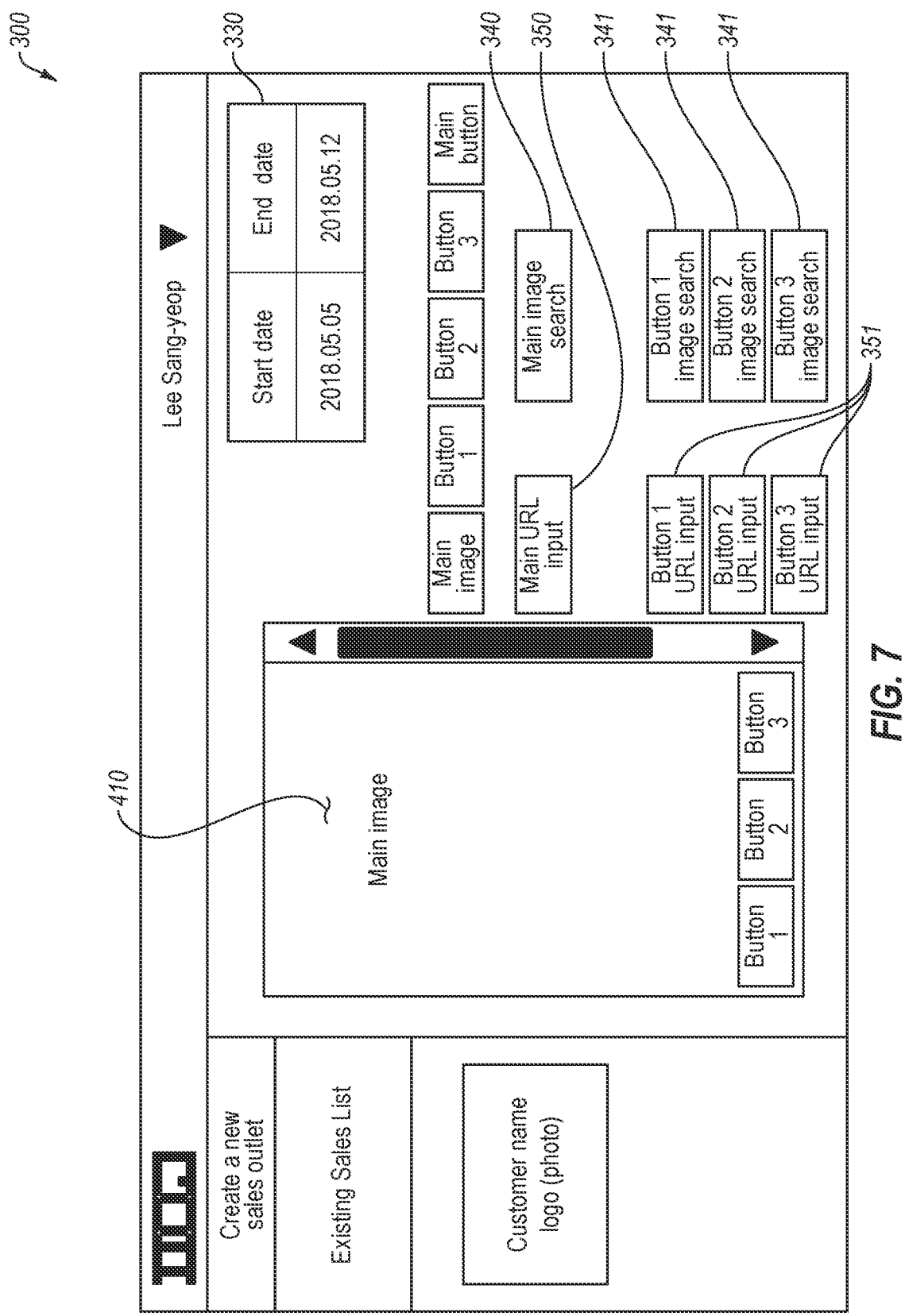
FIG. 7 is a diagram showing a production page in a marketing system according to the present invention.

FIG. 7 is a diagram showing a production page in a marketing system according to the present invention.

Referring to FIG. 7, the production tool of the production page 300 includes a main image upload menu 340 for uploading a main image, a main address input menu 350 for inputting and uploading a main image address linked to the main image, a button image upload menu 341 for uploading an image of the movement button, and a button address input menu 351 for inputting and uploading a movement button address linked to the movement button. The administrator terminal uploads the main image and the main image address to toe central server through the inputs of the main image upload menu and the main address input menu, and uploads the image and address of the movement button to the central server through the inputs of the button image upload menu and the button address input menu.

In more detail, in the schedule management unit 330, a start date is automatically generated, and an end date is directly input from the administrator terminal.

Figure 8:
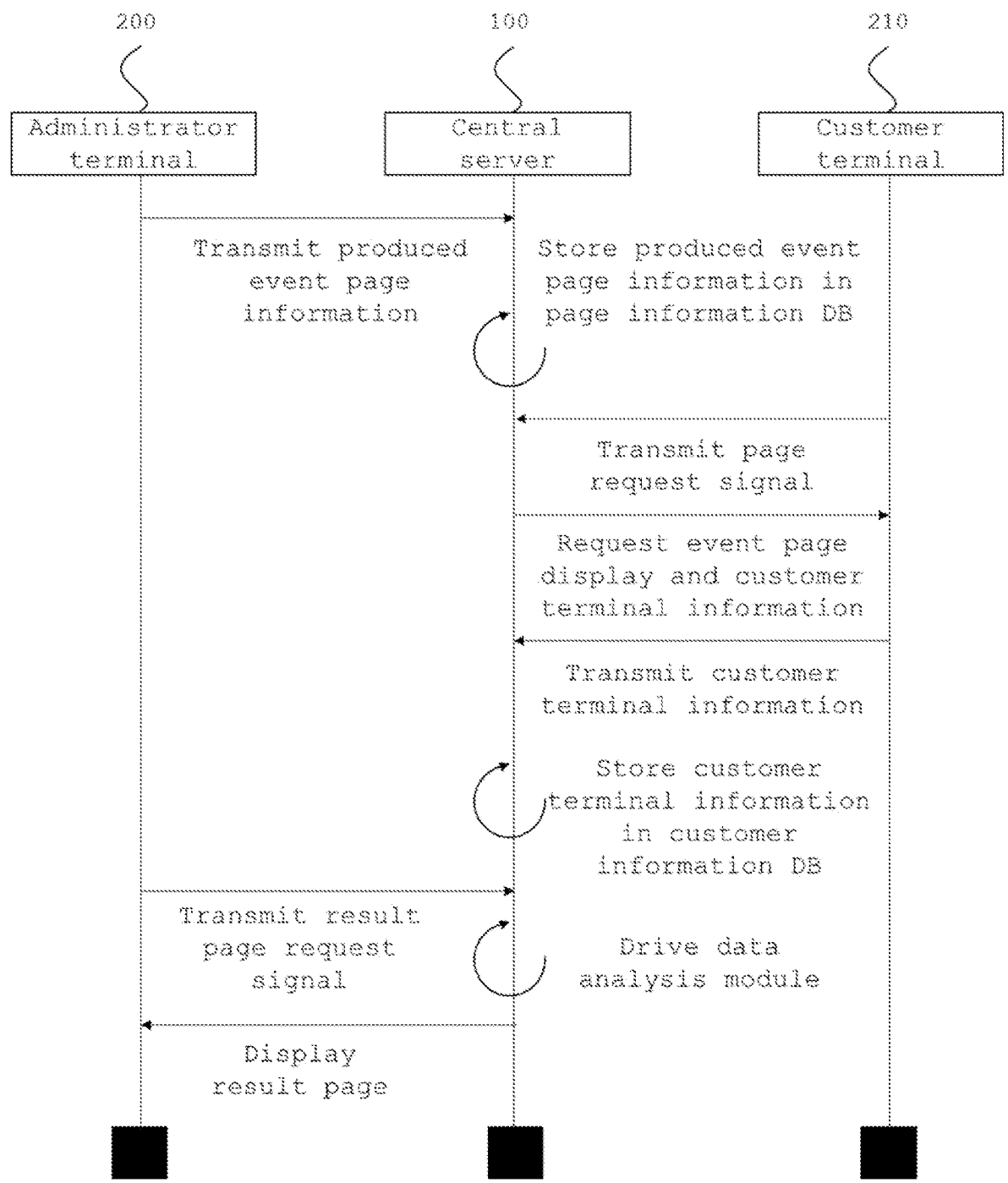
FIG. 8 is a schematic flow diagram of marketing system according to the present invention.

FIG. 8 is a schematic flow diagram of a marketing system according to the present invention.

Referring to FIG. 8, the administrator terminal 200 transmits information about the event page 400 that has been produced to the server. The server stores the information on the event page 400 produced by the administrator terminal 200 in the page information DB 130. When the customer terminal transmits a page request signal to the server, the server displays the event page 400 produced on the customer terminal, collects information about the customer terminal through the customer information acquisition unit 140 mounted on the server, and records the behavior including each page request signal of the customer terminal, and stores it in the customer information DB 150. When the request signal for the result page 500 is received from the administrator terminal 200, the server converts the data stored in the customer information DB 150 into a chart through the data analysis module 160, and provides the chart to the administrator terminal 200.

FIG. 9 is a diagram showing a main image address window that varies according to an access route in a marketing system according to the present invention.

Referring to FIG. 9 the main image address includes access route information. When the customer terminal accesses the event page at an arbitrary location, the customer information acquisition unit 140 acquires an URL accessed by a customer, and identifies the access route of the customer terminal by checking the access route information from the URL. In addition, the customer information acquisition unit 140 automatically collects an access area in which the customer terminal 210 accesses through the GPS system of the customer terminal 210, or collects location information of the customer terminal through base stations, and further acquires survey personal Information data input through the customer terminal 210.

In more detail, when the address of the main image is '11.co.kr' (see 'a' of FIG. 9), and is exposed on Facebook®, '/f' is added to obtain '11.co.kr/f' as the access route information. When the customer terminal accesses at an arbitrary location, the customer information acquisition unit may obtain the URL through which the event page is accessed and identify the obtained access route information, thereby identifying the access route (see 'b' of FIG. 9).

In addition, in the case of exposing the event page in a Naver® blog, when a customer terminal accesses the event page from the Naver® blog, by adding /n to the access route as '11.co.kr/n', the customer information acquisition unit may obtain the URL of the event page and identify the obtained access route, thereby identifying the access route (see 'c' in FIG. 9). Although the present invention has been described in detail through specific examples, this is for explaining the present invention in detail, and the present invention is not limited thereto. Accordingly, it is apparent that modifications or improvements are possible by those of ordinary skill in the art within the technical idea of the present invention.

All simple modifications to changes of the present invention belong to the scope of the present invention, and the specific scope of protection of the present invention will become apparent by the appended claims.

DESCRIPTION OF REFERENCE NUMERAL

100: Central server 110: Transmission/reception unit.
120: Production tool 130: Page information DB
140: Customer information acquisition unit 150: Customer information DB
160: Data analysis module 170: Data output module
200: Administrator terminal 210: Customer terminal
300: Production page 310: Login window
320: Member information input button 330: Schedule management unit
340: Main it image upload menu 341: Button image upload menu
350: Main address input menu 351: Button address input menu.
400: Event page 410: Main image
420: Movement button 430: Main button
500: Result page 510: Customer detail information sheet
520: Sex analysis chart 530: Weekly response chart
540: Age-specific chart

The invention claimed is:

1. A marketing system that supports sales of goods by interlocking a customer terminal and an administrator terminal, the marketing system comprising:
a central server which provides an event page production tool to the administrator terminal, receives information about an event page, and transmits the event page to the customer terminal;
the administrator terminal that receives the event page production tool from the central server and inputs corresponding variables to produce the event page;
the customer terminal that receives the event page produced by the administrator terminal from the central server and inputs necessary information while performing a process provided by the event page
wherein the event page includes a main image displayed on a main screen;
a movement button displayed on a portion of the main screen;
wherein the main image and the movement button are linked to each URL and when the main image or a movement button image is inputted, the event page moves to the corresponding URL;
wherein the movement button includes a first movement button linked with a URL of a purchase page where a product is purchased through the customer terminal;
a second movement button linked to a survey response page through which personal information including name, contact information, sex, and birth date information of the customer terminal is input;
a third movement button linked to a URL of a page provided with product sales information;
wherein each page displayed on the customer terminal when each of the first movement button, the second movement button, and the third movement button is clicked is provided at one end thereof with a main button for returning to a main of the event page;
wherein the central server includes a transmission/reception unit for transmitting and receiving data to and from the customer terminal and the administrator terminal;
a production tool for providing a production page for producing the event page to the administrator terminal to provide item input window information for inputting information to the production page;
a page information DB for storing configuration information of an event page input by the administrator terminal through the production page;
a customer information acquisition unit that accesses the event page to collect information input by the customer terminal;
a customer information DB for storing information about the customer terminal collected by the customer information acquisition unit;
a data analysis module for classifying a number of customer terminal information stored in the customer information DB by items including age, sex, number of clicks of each button existing in an event, and access route, and charting or statistically analyzing the customer terminal information to generate a result page;
a data output module for performing a function of converting data analyzed through the data analysis module;
wherein a main image address includes access route information;
wherein the customer information acquisition unit acquires an URL accessed by a customer when the customer terminal accesses the event page at an arbitrary location;
identifies an access route of the customer terminal by checking the access route information from the URL;
automatically collects an access area to which the customer terminal accesses through a GPS system of the customer terminal or collecting location information of the customer terminal through a base station and further acquires survey personal information data input through the customer terminal;
wherein the central server provides a result page to display a result obtained by charting or statistically analyzing information input from a plurality of customer terminals accessing the event page of which production is completed, and delivered to the administrator terminal;
wherein the result page includes a customer detail information sheet that synthesizes personal information stored in a customer information DB and analyzes each item;
a sex analysis chart that analyzes and displays the sex of a customer who accesses the event page;
a weekly response chart prepared as a graph by analyzing a number of visitors by each day of a week;
an age-specific chart prepared as a graph by analyzing a number of visitors by ages;
wherein the result page converts each statistical data by using the data output module;

wherein the customer detail information sheet includes a number of event page visitors, a number of clicks of the main button, a number of clicks of the first movement button, a number of clicks of the second movement button, and a number of clicks of the third movement button; and wherein the marketing system provides detail information of a customer by analyzing the number of clicks and classifying the number of clicks into an event interest rate, purchase possibility rate, a frequenter possibility rate, a membership registration rate, an event activation rate, and an SNS dependent rate.

2. The marketing system of claim 1, wherein the event page production tool includes a main address input menu through which the main image address linked to the main image is input and uploaded, a button image upload menu for uploading the movement button image, and a button address input menu for inputting and uploading a movement button address linked to the movement button, wherein the administrator terminal uploads the main image and the main image address to the central server through an input of a main image upload menu and the main address input menu, and uploads the movement button image and the movement button address to the central server through an input of the button image upload menu and the button address input menu.

3. The marketing system of claim 1, wherein the production page includes a login window for inputting an ID and a password; and a member information input button for providing a page for newly registering member information including an ID and a password to be registered in the administrator terminal.

\* \* \* \* \*